Jan. 19, 1937.　　D. P. VARNER ET AL　　2,067,995
ELECTRODE HOLDER
Filed March 21, 1935
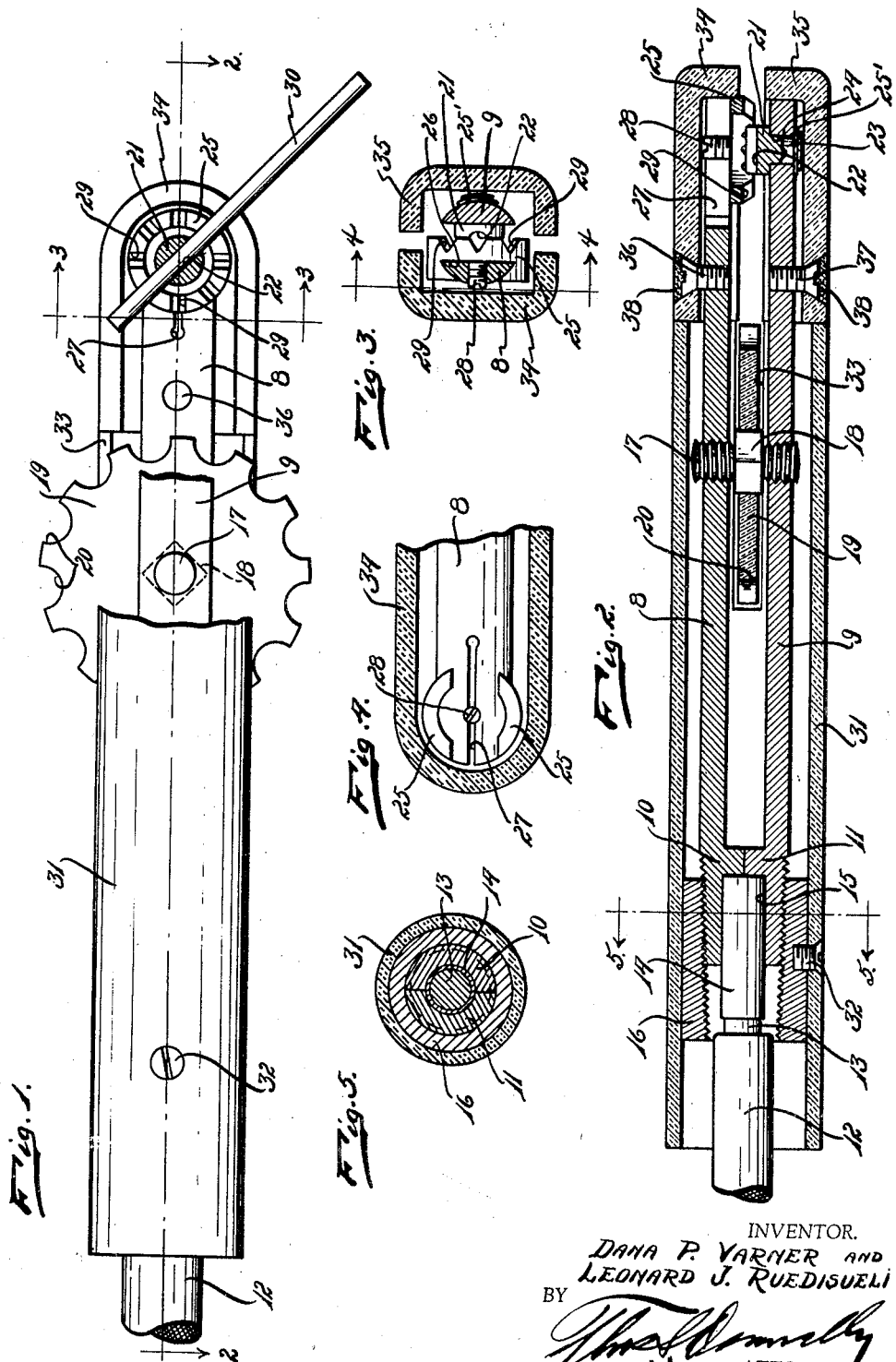
INVENTOR.
DANA P. VARNER AND
LEONARD J. RUEDISUELI
BY
ATTORNEY Patented Jan. 19, 1937

2,067,995

UNITED STATES PATENT OFFICE 2,067,995

ELECTRODE HOLDER

Dana P. Varner, Melvindale, and Leonard J. Ruedisueli, Detroit, Mich.

Application March 21, 1935, Serial No. 12,212

2 Claims. (Cl. 219—8)

Our invention relates to a new and useful improvement in an Electrode holder, used in arc welding.

It is an object of the present invention to provide an electrode holder with a rotary tip or jaw by means of which the electrode engaged thereby may be turned to any desired angle without destroying or lessening the grip on the electrode.

Another object of the invention is the provision of an electrode holder that is completely insulated so that accidental arcing or burning of parts of the holder is prevented.

Another object of the invention is the provision of an electrode holder so arranged and constructed that it can not clog and is protected to a maximum degree from parting and burning.

Another object of the invention is the provision in an electrode holder of means for easily and quickly engaging and disengaging the electrode.

Another object of the invention is the provision in an electrode holder of positive gripping jaws which may be positively moved in either direction.

Another object of the invention is the provision of a mechanism whereby the electrode is gripped by the retaining jaws in such a manner as to prevent the welding of the electrode to the holder, the generation of high heat and thus facilitate an easy and quick feeding of the electrode when desired.

Another object of the invention is the provision in an electrode holder of gripping jaws which may be easily and quickly removed and replaced.

Another object of the invention is the provision of a simple and effective means for connecting a cable to the electrode.

Other objects will appear hereinafter.

The invention consists in the combination and arrangement of parts, hereinafter described and claimed.

The invention will be best understood by a reference to the acompanying drawing which forms a part of this specification and in which, Fig. 1 is a side elevational view of the invention with parts broken away.

Fig. 2 is a sectional view taken on line 2—2 of Fig. 1.

Fig. 3 is a sectional view taken on line 3—3 of Fig. 1.

Fig. 4 is a sectional view taken on line 4—4 of Fig. 3.

Fig. 5 is a sectional view taken on line 5—5 of Fig. 2.

In the invention we provide a pair of metallic bars 8 and 9 which are provided at one end with semi-circular heads 10 and 11 respectively. Each of these heads is threaded on its periphery. The feed cable 12 is provided at the exposed part 13 with a covering or sleeve 14 which engages in the socket 15 formed in the heads 10 and 11. It will be noted that the periphery of these heads 10 and 11 is tapered so that as the coupling sleeve 16 is threaded on to the heads, these heads are brought into tight clamping relation with the sleeve 14 to securely attach the cable to the bars 8 and 9. Threaded through the bars is a stud 17 having its opposite ends oppositely threaded and provided at its center with a flat faced box 18 on which is mounted the disk 19 of insulating material. The disk 19 is provided on its periphery with notches 20 to afford means for gripping so that by rotating the disk 19 the free ends of the bars 8 and 9 may be moved into approach or away from each other depending upon the direction of rotation of the disk 19. Rotatively mounted on the free end of the bar 9 is a gripping jaw 21 in the face of which is formed the groove 22. Extending from this jaw 21 is a neck or stud 23 which is projected through the opening 24 formed in the bar 9 and upset over a spring washer 25'. This jaw 21 is rotatable on the neck 23 but the spring washer 25' serves normally to resist rotation of this jaw and act as a retainer.

The jaw 21 co-operates with a jaw 25. This jaw 25 is provided on its outer face with a dovetailed groove 26 in which engages the end of the bar 8. This end is slitted as at 27 and after the jaw 25 is moved into position on the slitted end of the bar 8, this slitted end is expanded by means of a screw 28 which threads into an opening formed in the slitted portion. The jaw 25 is, of course, stationary relatively to the bar 8 and is provided on its inner face with recesses 29. As shown in Fig. 1 these recesses are positioned diametrically opposite to each other so that when the electrode or welding wire 30 rests in the groove 22 it may also rest in a pair of oppositely exposed recesses 29, since the jaw 25 is formed cup shaped.

Positioned over the jaws 8 and 9 to provide an insulated handle portion is the tubular sleeve 31 which is held in position by the screw 32. The forward end of this insulating tube 31 is slitted at end 33 to accommodate the disk 19. Mounted on the forward end of the bars 8 and 9 so as to cover the gripping jaws, are insulating plates plates 34 and 35 which are held in position by the screws 36 and 37 respectively. These screws are counter-sunk to leave at their outer faces a recess in which a suitable filler 38 of insulating material may be mounted so that none of the metallic parts which are connected to the sleeve 14 are exposed.

When the electrode 30 is mounted between the jaws a rotating of the disk 19 will move the jaws into clamping relation with the electrode. In view of the location of the disk 19, the same may be easily and quickly rotated in either direction by the thumb of the operator while the rest of the hand grips the insulating handle tube 31. It is desired that the pitch of the threads on the stud 17 be such that a minimum rotation of the disk 19 be required in order to effect a disengagement or an engagement of the electrode. The parts 8 and 9 are formed from metal, and in view of the fact that they are free at their jaw carrying ends, there will be a certain resiliency in these bars. Consequently upon a slight lessening of the pressure on the jaws the electrode may be rotated. This varies positions relatively to the bars 8 and 9. In this movement the jaw 21 will rotate and the electrode will ride over the notch 29. In the form illustrated, we have provided 8 of these notches which would permit the movement of the electrode to any 45 degree position. Of course, the number of notches may be increased or diminished as desired.

With an electrode holder constructed in this manner the advantages enumerated are obtained. It is believed obvious that the device is of directive and economical construction and it may be easily and quickly assembled and easily operated. In moving the electrode from one position to another the welding wire 30 will serve to scrape off any weld metal which may be clinging to the jaws. Due to the complete insulation of the device, the danger in operation is reduced to a minimum and undue arcing of the device is also reduced to a minimum. Because the device is completely insulated, the operator may rest the electrode holder on a suitable support in order to steady the work. By having the engaging jaws detachable, the device becomes economical as the parts subjected most to wear may be removed and replaced. It will be noted that while the electrode is being turned from one position to another, there is still tension on the electrode or welding wire 30. Consequently at all times there is a good electrical contact between the jaws and the electrode thus obviating the disadvantages of rust engagement.

While we have illustrated and described the preferred form of construction, we do not wish to limit ourselves to the precise details of structure shown, but it is to avail ourselves of such variations and modifications as come within the scope of the appended claims.

Having thus described our invention what we claim is new and desire to secure by Letters Patent is:

1. In an electrode holder of the class described, comprising: a pair of bars, each of said bars having at one end a semi-circular, peripherally-threaded head, the heads on said bars cooperating to form a circular body having a bore therein; a conductor inserted into said bore; an internally-threaded, internally-tapered sleeve for the reception of said threaded end of said bars, the threading of said bars into said sleeves effecting a clamping of said conductor in said bore.

2. An electrode holder of the class described, comprising: a pair of bars; means for securing said bars together at one of their ends; clamping bodies mounted on the free ends of said bars; a disk positioned between said bars, intermediate their ends; a threaded member projecting outwardly from opposite faces of said disk, said threaded member at opposite faces being oppositely threaded for threading into openings formed in said bars and adapted upon rotation of said disk for effecting a positive approach or withdrawal of said bars dependent upon the direction of rotation of said disk; and an insulating cover for said bars, said cover extending across the position of said disk and having slots formed on diametrically opposite sides for reception of said disk, said disk being of greater diameter than said cover.

DANA P. VARNER.
LEONARD J. RUEDISUELI.